(12) United States Patent
Strang et al.

(10) Patent No.: US 10,399,234 B2
(45) Date of Patent: Sep. 3, 2019

(54) SELF-LOCKING ROTARY HANDWHEEL ASSEMBLY FOR A ROBOTIC PARALLEL GRIPPER ASSEMBLY

(71) Applicant: Applied Robotics, Inc., Glenville, NY (US)

(72) Inventors: Timothy M. Strang, Saratoga Springs, NY (US); Stefan Casey, Rock City Falls, NY (US)

(73) Assignee: Applied Robotics, Inc., Glenville, NY (US)

( * ) Notice: Subject to any disclaimer, the term of this patent is extended or adjusted under 35 U.S.C. 154(b) by 169 days.

(21) Appl. No.: 15/700,789

(22) Filed: Sep. 11, 2017

(65) Prior Publication Data

US 2019/0077025 A1    Mar. 14, 2019

(51) Int. Cl.
| | |
|---|---|
| *B25J 15/02* | (2006.01) |
| *B25J 15/00* | (2006.01) |
| *G05G 5/12* | (2006.01) |
| *F16H 57/00* | (2012.01) |
| *G05G 1/12* | (2006.01) |
| *G05G 1/08* | (2006.01) |
| *G05G 5/00* | (2006.01) |
| *F16H 25/24* | (2006.01) |
| *F16H 25/20* | (2006.01) |

(52) U.S. Cl.
CPC ....... *B25J 15/0028* (2013.01); *B25J 15/0014* (2013.01); *F16H 25/2454* (2013.01); *F16H 57/0025* (2013.01); *G05G 1/08* (2013.01); *G05G 1/12* (2013.01); *G05G 5/005* (2013.01); *G05G 5/12* (2013.01); *F16H 2025/2062* (2013.01); *G05G 2505/00* (2013.01)

(58) Field of Classification Search
CPC .......................... B25J 15/026; B25J 15/0028; B25J 15/0014; B25B 1/00; B25B 1/02; B25B 1/04; B25B 1/20; B25B 5/00; F16H 25/2454; F16H 2025/2062; F16H 57/0025; G05G 1/08; G05G 1/12; G05G 5/005; G05G 5/12; G05G 2505/00
USPC .............................................. 294/207, 119.1
See application file for complete search history.

(56) References Cited

U.S. PATENT DOCUMENTS

| | | | | |
|---|---|---|---|---|
| 836,154 A | * | 11/1906 | Timby | ...................... B25B 1/20 269/244 |
| 3,927,778 A | * | 12/1975 | Zrostlik | .................. B60C 25/00 294/119.1 |

(Continued)

FOREIGN PATENT DOCUMENTS

| | | | | |
|---|---|---|---|---|
| DE | 102016111125 A1 | * | 12/2017 | .......... B25J 15/0213 |
| GB | 775111 A | * | 5/1957 | ............... B25B 1/06 |

*Primary Examiner* — Gabriela M Puig
(74) *Attorney, Agent, or Firm* — Heslin Rothenberg Farley & Mesiti P.C.; Stephen P. Scuderi

(57) ABSTRACT

A handwheel assembly includes a housing. A shaft having a central axis is rotatably supported by the housing. A locking device is rigidly attached to the housing. A rotary gear is circumferentially disposed over the shaft. A handwheel is circumferentially disposed over the shaft. The rotary gear and handwheel are operable to slide along the shaft from a first locked position to a second unlocked position. In the first locked position, the rotary gear is engaged with the locking device to rotationally lock the shaft. In the second unlocked position, the rotary gear is disengaged from the locking device to allow the shaft to rotate.

26 Claims, 10 Drawing Sheets

(56) References Cited

U.S. PATENT DOCUMENTS

| | | | | |
|---|---|---|---|---|
| 4,178,119 | A | * | 12/1979 | Busch .................... B65H 15/02 |
| | | | | 271/221 |
| 4,583,724 | A | * | 4/1986 | Huang ...................... B25B 1/20 |
| | | | | 269/182 |
| 4,765,668 | A | * | 8/1988 | Slocum ................ B25J 15/0052 |
| | | | | 294/119.1 |
| 5,755,475 | A | * | 5/1998 | Zajac, Jr. ............. B25J 15/0253 |
| | | | | 294/119.1 |
| 5,839,770 | A | * | 11/1998 | Zajac, Jr. ............. B25J 15/0253 |
| | | | | 294/207 |
| 6,309,003 | B1 | * | 10/2001 | Bertini ................. B25J 15/0253 |
| | | | | 294/119.1 |
| 8,123,234 | B2 | * | 2/2012 | Tomita .............. B23B 31/16004 |
| | | | | 269/164 |
| 10,105,854 | B1 | * | 10/2018 | Wong ..................... B25J 15/026 |
| 2001/0028175 | A1 | * | 10/2001 | Thompson ............. B25J 15/026 |
| | | | | 294/119.1 |
| 2016/0073514 | A1 | * | 3/2016 | Watanabe .............. H05K 3/306 |
| | | | | 29/741 |
| 2016/0167878 | A1 | * | 6/2016 | Oh ....................... B25J 15/0052 |
| | | | | 414/268 |

* cited by examiner

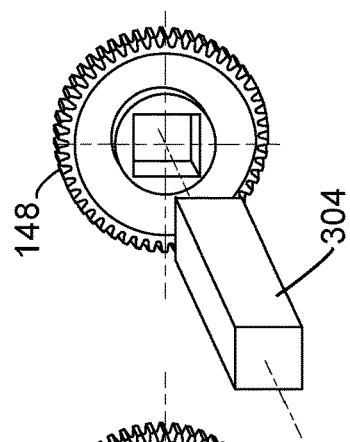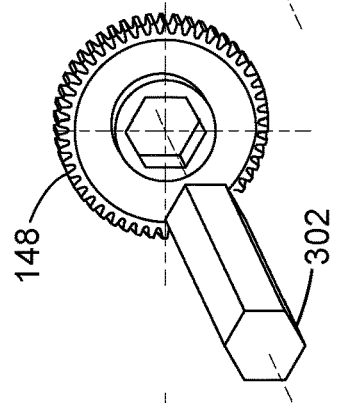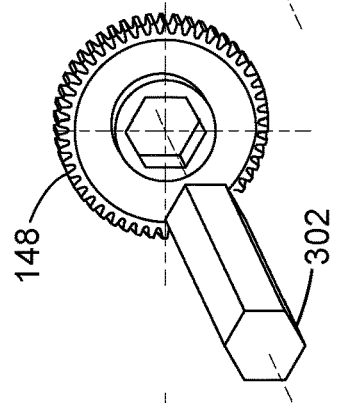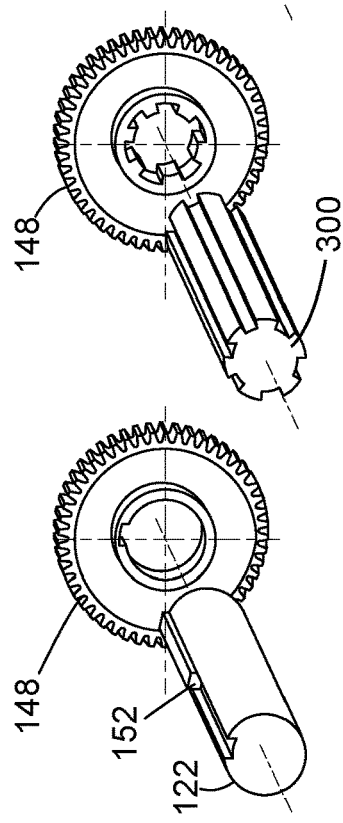

SELF-LOCKING ROTARY HANDWHEEL ASSEMBLY FOR A ROBOTIC PARALLEL GRIPPER ASSEMBLY

TECHNICAL FIELD

The present invention relates to self-locking handwheel assemblies for rotating mechanisms. More specifically, the invention relates to self-locking handwheel assemblies for parallel gripper assemblies mounted on robot arm assemblies.

BACKGROUND

Robotic parallel gripper assemblies mounted on robot arm assemblies are used extensively in industrial assembly line applications to grip, pick up and stack mass produced products. For example, one type of parallel gripper assembly is known as a bag gripper. The bag gripper typically has a pair of parallel booms with a plurality of fingers (i.e., the grippers) clamped to the booms. The gripper assembly controls the movement of the booms and fingers. The fingers are bent at right angles and are operable to pick up bags of product, such as mulch, garden rocks, sugar, cement, dog food or the like. The bag gripper will then stack the product on pallets for shipping. Another type of parallel gripper assembly is known as a box gripper. The box gripper will have paddles, instead of fingers, attached to the parallel booms. The paddles are operable to pick up multiple boxes and stack the boxes on pallets for shipping.

The distance between the pair of parallel booms can be adjusted and locked in place in order to accommodate different sizes and weights of products. For example, the booms may be rigidly attached to metal arms and the metal arms may be rigidly attached to clamping mechanisms for controlling movement of the booms and grippers. The clamping mechanisms may, in turn, be rigidly attached to mounting plates that slide on rails attached to a frame of the parallel gripper assembly. Therefore, movement of the metal plates along the rails will adjust the distance between the parallel booms. Once the mounting plates are adjusted, they can be locked in place with, for example, hand tools that bolt or clamp the mounting plates down.

The distance between the booms is critical. If the booms are too far apart, the grippers may not be able to consistently pick up the product from the assembly line. If the booms are too close, the grippers could damage the product. Therefore, once the booms are adjusted, the locking mechanism must be able to rigidly hold the booms in position during operation.

Problematically, during operation, parallel grippers are subjected to a great deal of vibration that can eventually loosen the prior art locking mechanisms and cause the booms to shift. This is due, in large part, to the repetitious nature of the parallel gripper's operation, as well as the weight of the products being stacked. For example, the product being lifted off of an assembly line and palletized can easily be in the range of 50 to 100 pounds in weight, and may be stacked at the rate of once every two seconds for tens of thousands of cycles per day.

Once the booms have shifted, product may be damaged and the production line may have to be shut down in order to re-adjust and re-clamp the booms. Further, the use of hand tools to adjust and clamp the booms can be time consuming and labor intensive.

Accordingly, there is a need for a mechanism to adjust the distance between booms of a parallel gripper assembly without the use of hand tools. Also there is a need for a locking mechanism for locking the booms into position that is largely unaffected by constant vibrations during operation. As such, the locking mechanism would be easier to operate and less susceptible to unlocking and shifting during operation of the parallel gripper.

BRIEF DESCRIPTION

The present invention offers advantages and alternatives over the prior art by providing a self-locking handwheel assembly for a robotic parallel gripper, or other similar device. The handwheel assembly can slide between a first locked position and a second unlocked position. In the second unlocked position, the handwheel assembly may be operated by hand to adjust the distance between a pair of booms of a parallel gripper.

Once the handwheel assembly is released from its second unlocked position, it may be urged by an actuating device into its first locked position. In the first locked position the handwheel assembly self-locks in place without the use of hand tools. Further, the locking device of the handwheel assembly is largely unaffected by vibrations and less susceptible to coming loose relative to prior art locking devices.

A handwheel assembly in accordance with one or more aspects of the present invention includes a housing. A shaft having a central axis is rotatably supported by the housing. A locking device is rigidly attached to the housing. A rotary gear is circumferentially disposed over the shaft. A handwheel is circumferentially disposed over the shaft. The rotary gear and handwheel are operable to slide along the shaft from a first locked position to a second unlocked position. In the first locked position, the rotary gear is engaged with the locking device to rotationally lock the shaft and, in the second unlocked position, the rotary gear is disengaged from the locking device to allow the shaft to rotate.

Another handwheel assembly in accordance with one or more aspects of the present invention includes a housing. A shaft having a central axis is rotatably supported by the housing. A linear gear rack is rigidly attached to the housing. The gear rack includes a linear toothed surface having linear teeth extending substantially perpendicular to the central axis. A rotary gear is circumferentially disposed over the shaft. The rotary gear includes a circumferential outer toothed surface having rotary gear teeth extending radially around the central axis. A spring is circumferentially disposed over the shaft between the housing and the rotary gear. A handwheel is circumferentially disposed over the shaft. The rotary gear and handwheel are operable to slide along the shaft from a first locked position to a second unlocked position. In the first locked position, the spring is extended to urge the rotary gear teeth into engagement with the linear teeth and, in the second unlocked position, the spring is compressed to allow the rotary gear teeth to disengage from the linear teeth.

A parallel gripper assembly in accordance with one or more aspects of the present invention includes a frame. The frame has a first side, a second side and a top side. The first and second sides extend longitudinally between a first end portion and a second end portion. The top side has a mounting structure disposed thereon operable to rigidly attach to a robot arm assembly. A first handwheel assembly is rigidly attached to the first side at the first end portion of the frame. A second handwheel assembly is rigidly attached to the second side at the second end portion of the frame. The first and second handwheel assemblies each include:

A housing.

A shaft rotatably supported by the housing, the shaft having a central axis.

A locking device rigidly attached to the housing.

A rotary gear circumferentially disposed over the shaft.

A handwheel circumferentially disposed over the shaft.

The rotary gear and handwheel are operable to slide along the shaft from a first locked position to a second unlocked position.

In the first locked position, the rotary gear is engaged with the locking device to rotationally lock the shaft and, in the second unlocked position, the rotary gear is disengaged from the locking device to allow the shaft to rotate.

Another parallel gripper assembly in accordance with one or more aspects of the present invention includes a frame. The frame has a first side, a second side and a top side. The first and second sides extend longitudinally between a first end portion and a second end portion. The top side has a mounting structure disposed thereon operable to rigidly attach to a robot arm assembly. A handwheel assembly is rigidly attached to the first side at the first end portion of the frame. The handwheel assembly includes:

A housing.

A shaft rotatably supported by the housing, the shaft having a first central axis.

A first lead screw rigidly connected to the shaft such that the first lead screw rotates about the first central axis when the shaft is rotated by the handwheel, the first lead screw having one of a left hand thread and a right hand thread.

A locking device rigidly attached to the housing.

A rotary gear circumferentially disposed over the shaft.

A handwheel circumferentially disposed over the shaft.

The rotary gear and handwheel are operable to slide along the shaft from a first locked position to a second unlocked position.

In the first locked position, the rotary gear is engaged with the locking device to rotationally lock the shaft and, in the second unlocked position, the rotary gear is disengaged from the locking device to allow the shaft to rotate.

A second lead screw is operably connected to the first lead screw such that the second lead screw rotates about a second central axis when the shaft is rotated by the handwheel. The second lead screw is disposed on the second side of the frame. The second lead screw has the other of the left hand thread and the right hand thread.

DRAWINGS

The invention will be more fully understood from the following detailed description taken in conjunction with the accompanying drawings, in which:

FIG. 6A is an exploded view of an exemplary embodiment of a shaft of the handwheel assembly of FIG. 5, the shaft having a drive key to lock a rotary gear thereon in accordance with the present invention;

FIG. 6B is an exploded view of an exemplary embodiment of a shaft of the handwheel assembly of FIG. 5, the shaft having a spline section to lock a rotary gear thereon in accordance with the present invention;

FIG. 6C is an exploded view of an exemplary embodiment of a shaft of the handwheel assembly of FIG. 5, the shaft having a hexagonal section to lock a rotary gear thereon in accordance with the present invention;

FIG. 6D is an exploded view of an exemplary embodiment of a shaft of the handwheel assembly of FIG. 5, the shaft having a square section to lock a rotary gear thereon in accordance with the present invention;

Figure 1:
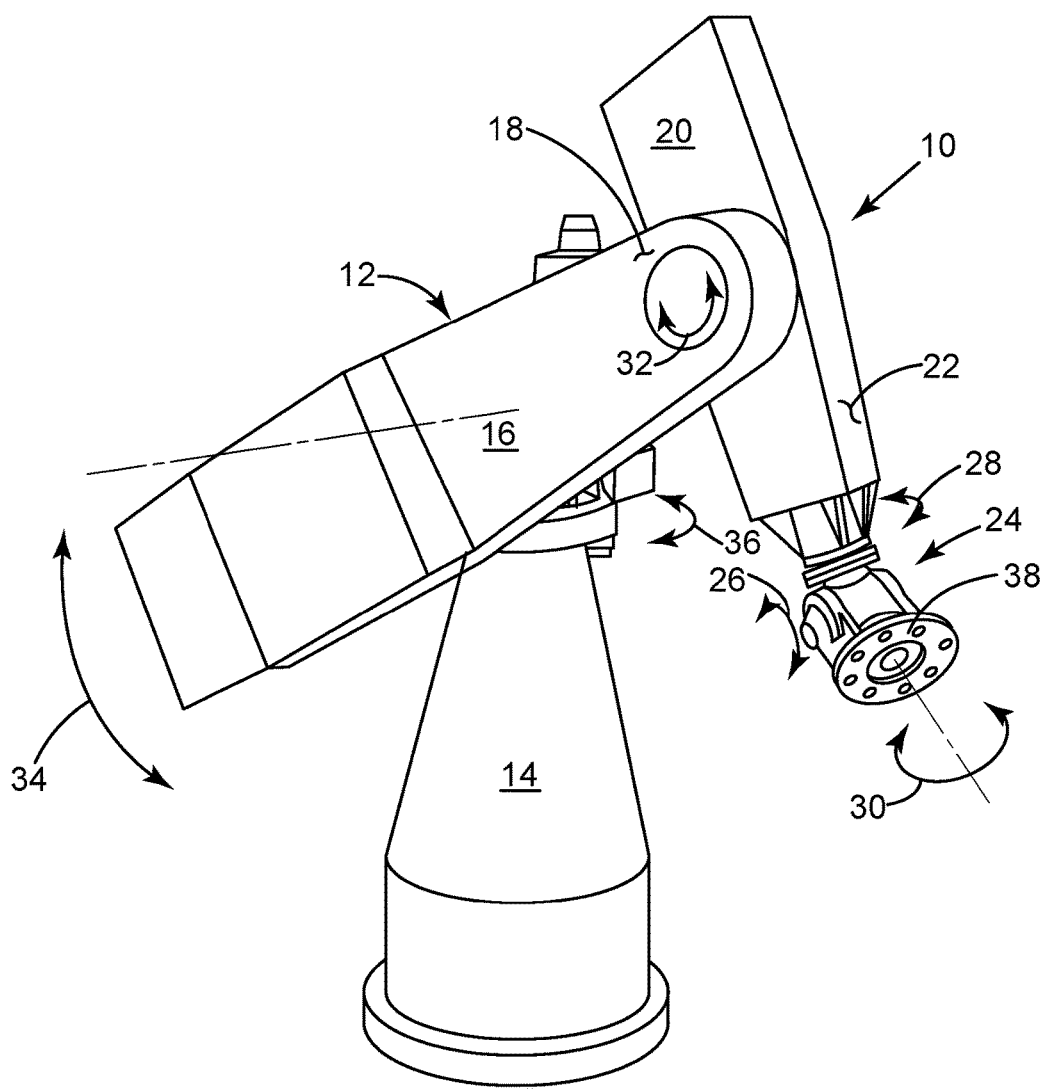
FIG. 1 is a perspective view of an exemplary embodiment of a robot having a robot arm assembly suitable for mounting a parallel gripper assembly thereon in accordance with the present invention.
Figure 10A:
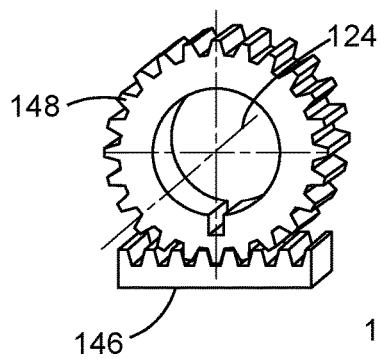
FIG. 10A is perspective view of an exemplary embodiment of a rotary gear engaging with a linear gear locking rack of FIG. 9 used as a locking device in accordance with the present invention.
Figure 10B:
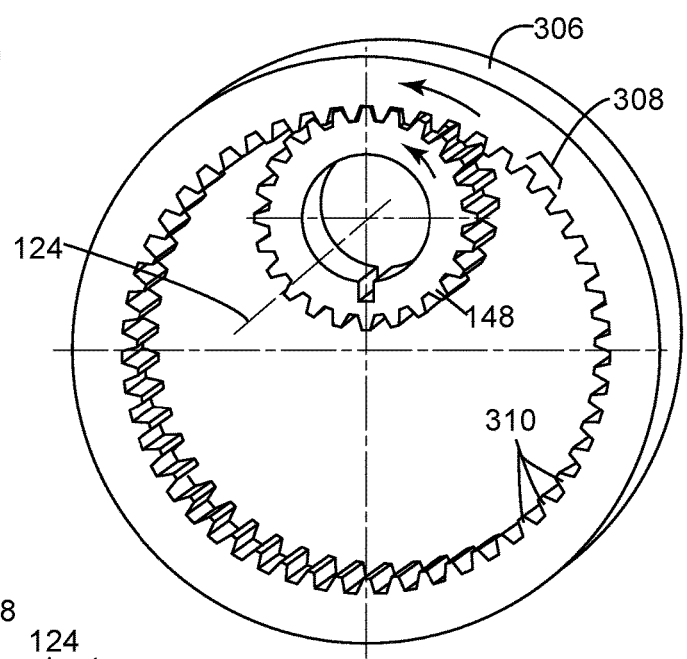
FIG. 10B is a perspective view of an exemplary embodiment of the rotary gear engaging with a female gear locking rack used as an alternative locking device in accordance with the present invention.
Figure 10D:
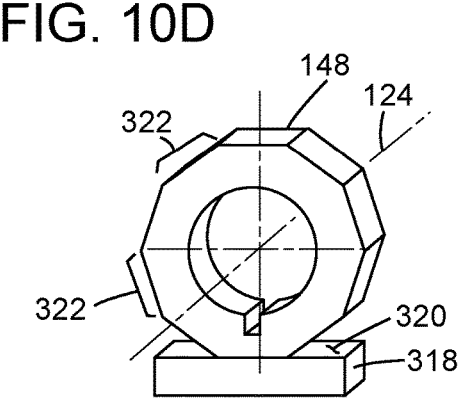
FIG. 10C is a perspective view of an exemplary embodiment of the rotary gear engaging with a curvic coupling locking rack used as an alternative locking device in accordance with the present invention.
Figure 11:
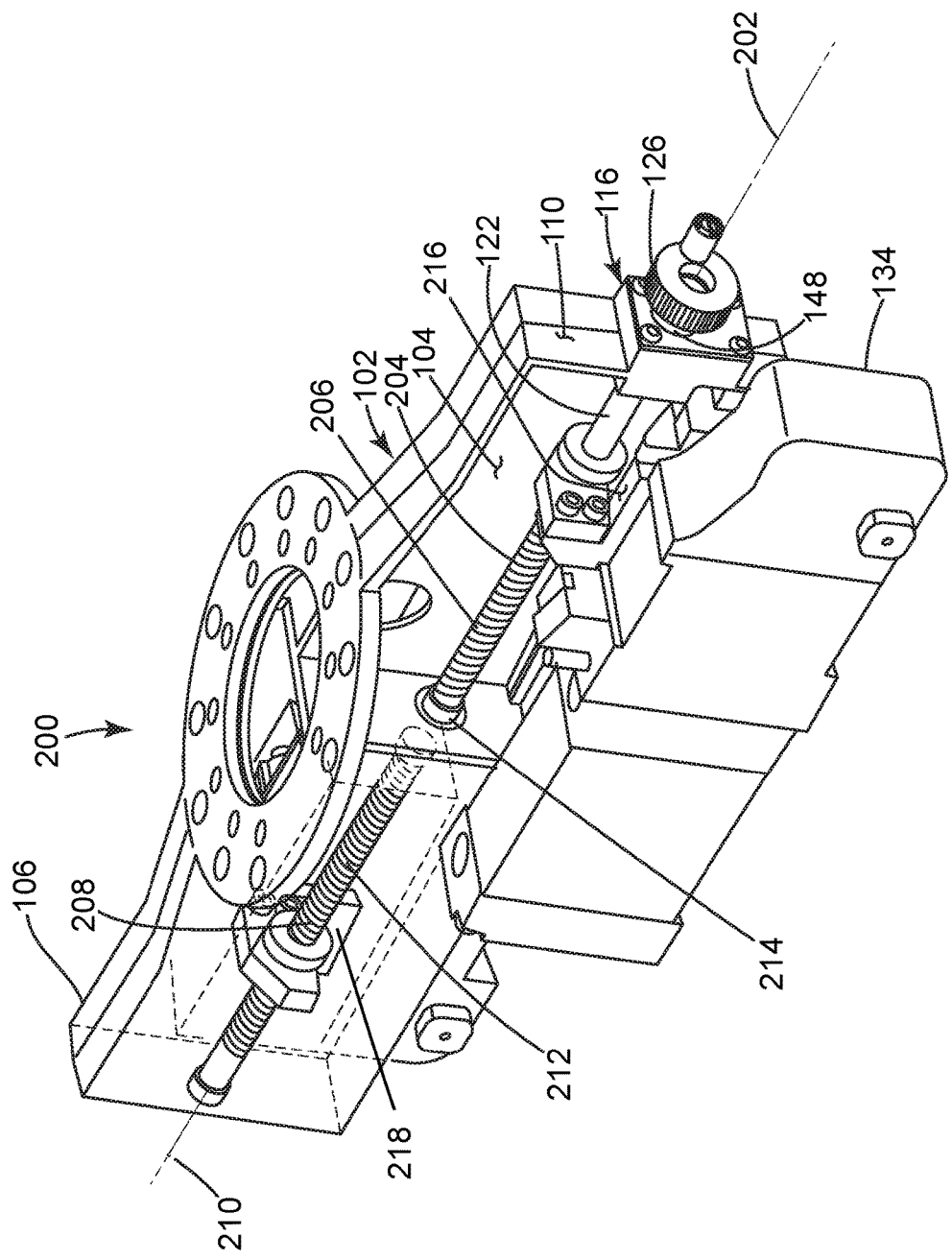

FIG. 10D is a perspective view of an exemplary embodiment of the rotary gear having rotary gear flats that engage with a rack flat portion of a locking rack used as an alternative locking device in accordance with the present invention; and FIG. 11 is a perspective view of another exemplary embodiment of a parallel gripper assembly operable to attach to the robot arm assembly of FIG. 1, wherein the parallel gripper assembly includes frame with a handwheel assembly operatively connected to both a first lead screw mounted on a first side of the frame and a second lead screw mounted on a second side of the frame in accordance with the present invention.

DETAILED DESCRIPTION

Certain exemplary embodiments will now be described to provide an overall understanding of the principles of the structure, function, manufacture, and use of the methods, systems, and devices disclosed herein. One or more examples of these embodiments are illustrated in the accompanying drawings. Those skilled in the art will understand that the methods, systems, and devices specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Referring to FIG. 1, a perspective view of an exemplary embodiment of a robot 10 having a robot arm assembly 12 suitable for mounting a parallel gripper assembly 100 (best seen in FIG. 2) thereon in accordance with the present invention is presented. In FIG. 1 the robot is an embodiment of a six-axis industrial robot 10, however other robots may utilize the parallel gripper assembly 100 as well. The robot 10 includes the robot arm assembly 12 mounted on a base 14. The robot arm assembly includes a main arm 16, a forearm 20 and a wrist assembly 24.

The main arm 16 of the arm assembly 12 is rotatably and pivotably mounted on the base 14. Rotatably attached to a distal end portion 18 of the main arm 16 is the forearm 20 which is capable of being rotated relative to the main arm 16. Attached to a distal end portion 22 of the forearm 20 is the multi-axis wrist assembly 24. Motion about each of the six axes may be provided by a motor, a servo mechanism (not shown) or the like. The wrist assembly 24 is provided with three articulations, that is, an up/down rotation indicated by arrow 26, a left/right rotation indicated by arrow 28 and a third pivoting motion indicated by arrow 30. Additionally, a rotation of the forearm 20 relative to the main arm 16 is indicated by the arrow 32 while a rotation of the main arm 16 relative to the base 14 is indicated by the arrow 34. Finally, the pivoting motion of the main arm 16 relative to the base 14 is indicated by the arrow 36. A mounting structure, such as a mounting plate 38 is mounted upon the outer end of the wrist assembly 24 to secure the parallel gripper assembly 100 to the industrial robot 10.

Figure 2:
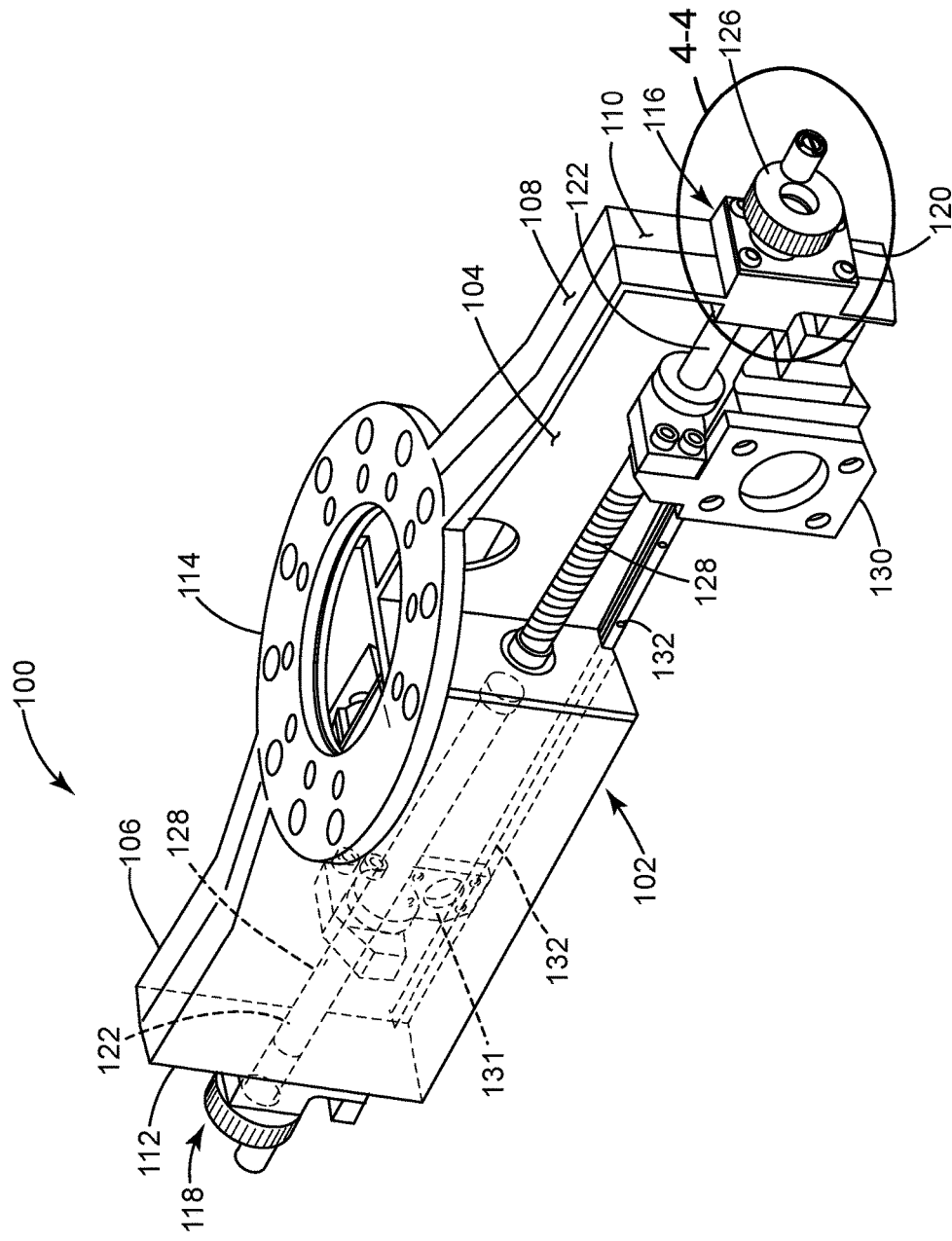
FIG. 2 is a perspective view of an exemplary embodiment of a parallel gripper assembly operable to attach to the robot arm assembly of FIG. 1, wherein the parallel gripper assembly includes a frame with a first and a second handwheel assembly mounted on opposing end portions of the frame in accordance with the present invention.

Referring to FIG. 2, a perspective view of an exemplary embodiment of a parallel gripper assembly operable to attach to the robot arm assembly 12 of FIG. 1 is presented. The parallel gripper assembly 100 includes a frame 102 having a first side 104, a second side 106 and a top side 108. The first and second sides 104, 106 extend longitudinally between a first end portion 110 and a second end portion 112.

The top side 108 of the frame 102 has a mounting structure 114 disposed thereon, which is operable to rigidly attach to the robot arm assembly 12. The mounting structure 114, in this embodiment, is in the form of a mounting plate 114 that can be bolted to the mounting plate 38 at the end of the wrist assembly 24 of the robot arm assembly 12 of FIG. 1.

However, other mounting structures may also be used to attach the parallel gripper assembly 100 to the robot arm assembly 12. For example, the mounting structure 38 at the end of the wrist assembly 24 may be in the form of a chuck (not shown), which could mate to a mounting rod type structure (not shown) of the parallel gripper assembly 100.

A first handwheel assembly 116 is rigidly attached to the first side 104 at the first end portion 110 of the frame 102. A second handwheel assembly 118 is rigidly attached to the second side 106 at the second end portion 112 of the frame 102.

In this embodiment, the first and second handwheel assemblies 116, 118 are substantially the same. Therefore, for purposes of simplicity and clarity, only the first handwheel assembly 116 will be discussed in detail herein. However, the components and the reference numbers associated with those components are pertain to the second handwheel assembly 118 as well.

Accordingly, handwheel assembly 116 (as well as handwheel assembly 118) includes a housing 120. A shaft 122 is rotatably supported by the housing 120. The shaft has a central axis 124 (best seen in FIG. 4). A handwheel 126 is circumferentially disposed over the shaft.

A lead screw 128 is rigidly connected to the shaft 122 such that the lead screw 128 rotates about the central axis 124 when the shaft 122 is rotated by the handwheel 126. In this embodiment, the lead screw 128 is illustrated as being integrally a portion of the shaft 122. However, the lead screw 128 may also be a separate component that is releasably connectable to the shaft 122 as, for example, by a pair of mating plates (not shown) disposed at distal ends of the shaft 122 and lead screw 128 that are bolted together.

A first mounting plate 130 is movably engaged with the lead screw 128 such that rotation of the lead screw 128 moves the first mounting plate 130 longitudinally along the lead screw 128. A linear bearing 132 is rigidly connected to the frame 102 and extends longitudinally substantially parallel to the lead screw 128. The first mounting plate 130 is movably engaged with the linear bearing 132 such that the first mounting plate 130 moves longitudinally along the linear bearing 132 as it moves longitudinally along the lead screw 128. As will be discussed in greater detail herein, the combination of lead screw 128 and linear bearing 132 provides rigid support for the first mounting plate 130 and any other components that are attached to the first mounting plate 130.

Figure 3:
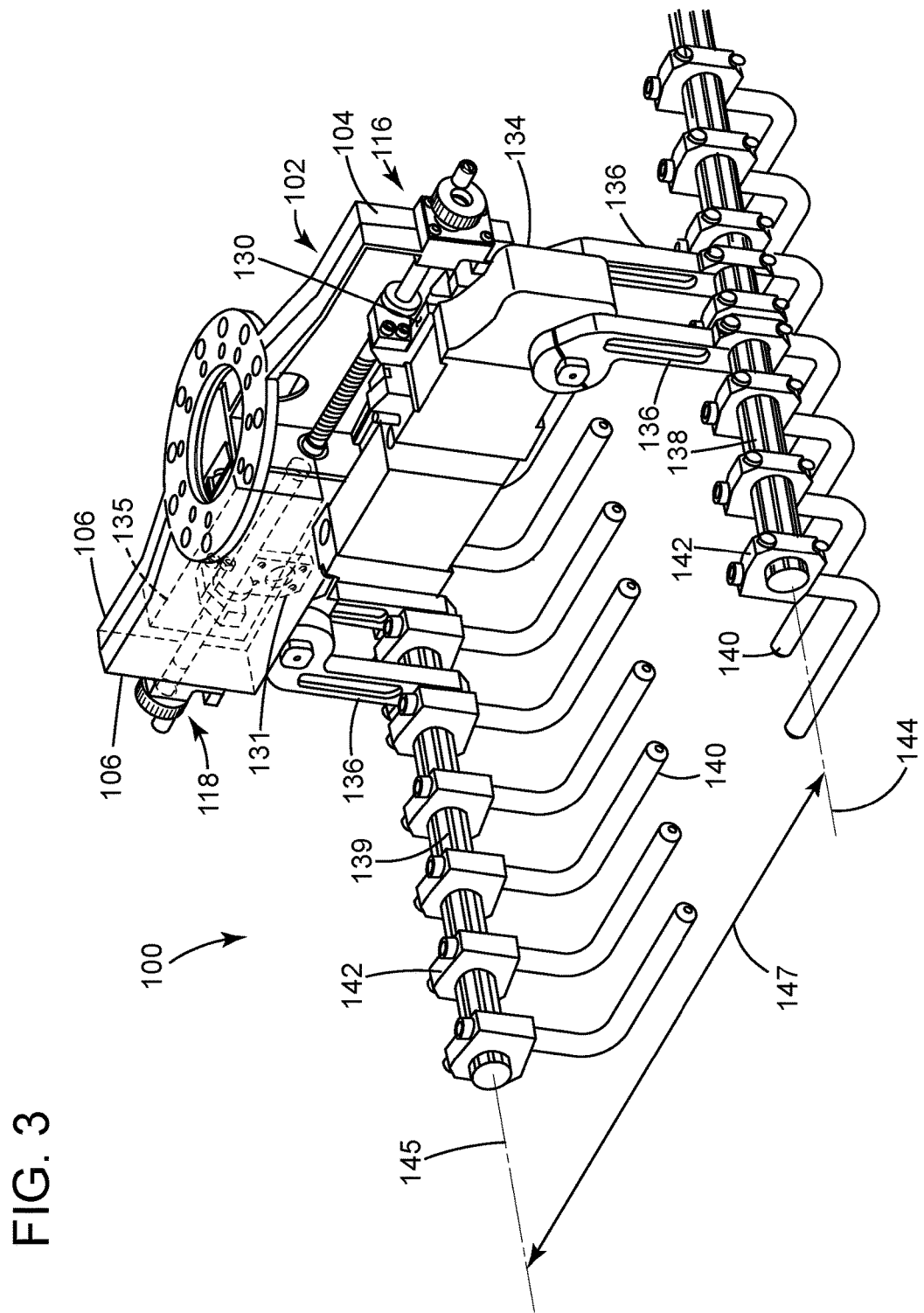
FIG. 3 is a perspective view of an exemplary embodiment of the parallel gripper assembly of FIG. 2 having a first and a second gripper rigidly attached to the first and second handwheel assemblies in accordance with the present invention.

Referring to FIG. 3, first and second clamping mechanisms 134, 135 are rigidly mounted to the first and second mounting plates 130, 131 associated with the first and second handwheel assemblies 116, 118 that are disposed on both the first and second sides 104, 106 of the frame 102. A pair of clamp arms 136 extend from the first and second clamping mechanisms 134, 135 to rigidly and rotationally attach a first and a second boom 138, 139 to the first and second clamping mechanisms 134, 135 respectively. The first and second booms 138, 139 extend substantially parallel to each other and have respective first and second centerlines 144, 145 separated by a centerline distance 147. A plurality of grippers 140 are rigidly attached to each boom 138, 139 by saddle clamps 142.

The clamping mechanisms 134, 135 are used to control the movement of the booms 138, 139 and grippers 140. The clamping mechanisms may be actuated by a variety of pneumatic and/or hydraulic lines (not shown).

The grippers 140 may be adapted to grip, pick-up and stack any number of objects, such as bags, boxes, individual mass produced components or the like. In this embodiment, the grippers 140 are in the form of fingers 140, which are bent at right angles and are operable to pick up bags of product, such as mulch, garden rocks, sugar, cement, dog food or the like. Therefore, in this embodiment, the parallel gripper assembly 100 functions as a bag gripper. During operation, the robot 10 will control the bag gripper 100, which will grab, pick-up and stack the product on pallets for shipping. Another type of parallel gripper assembly is known as a box gripper. The box gripper may have paddles (not shown), instead of fingers, attached to the clamp arms 136. The paddles are operable to pick up multiple boxes and stack the boxes on pallets for shipping.

The first boom 138 is effectively rigidly attached to the first mounting plate 130 of the first handwheel assembly 116 on the first side 104 of the frame 102. Additionally the second boom 139 is effectively rigidly attached to the second mounting plate 131 of the second handwheel assembly 118 on the second side 106 of the frame 102. Therefore, the centerline distance 147 between the first and second centerlines 144, 145 of the first and second booms 138, 139 can be controlled by rotation of either handwheel 126 of either handwheel assembly 116, 118.

Figure 4:
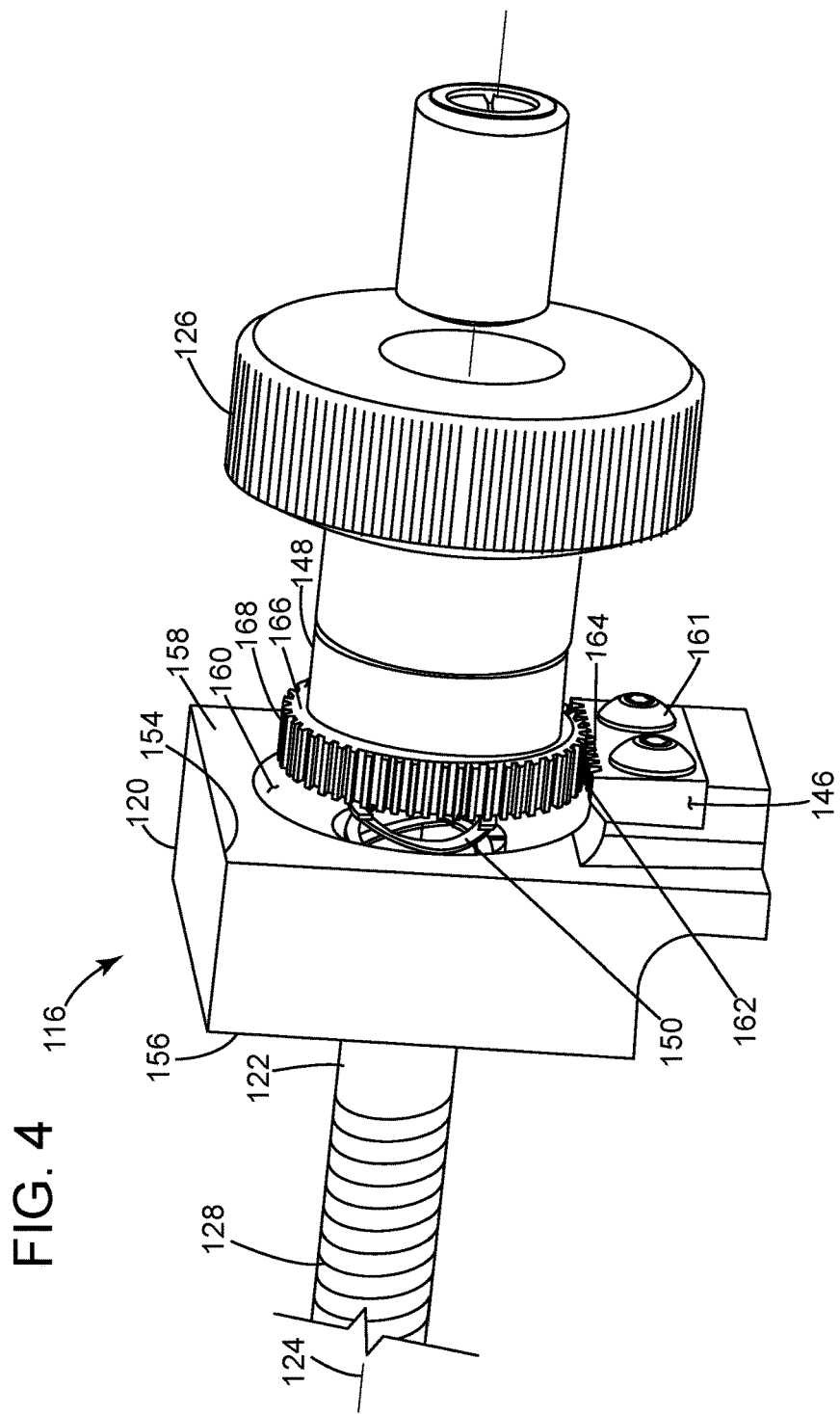
FIG. 4 is a perspective view of an exemplary embodiment of the handwheel assembly illustrated in circled area 4-4 of FIG. 2 in accordance with the present invention.

Referring to FIG. 4, a perspective view of an exemplary embodiment of the handwheel assembly 116 illustrated in circled area 4-4 of FIG. 2 in accordance with the present invention is presented. The handwheel assembly 116 includes the housing 120, the shaft 122 with its central axis 124 and the handwheel 126. The handwheel assembly 116 further includes a locking device (which in this embodiment is a linear gear rack) 146, a rotary gear 148, an actuating device (which in this embodiment is a spring) 150 and at least one drive key 152 (best seen in FIGS. 5, 7 and 8).

The housing further includes a front side 154 and a rear side 156. The front side 154 has an outer section 158 adjacent a recessed cavity section 160. The recessed cavity section 160 is sized to receive an outer circumference of the rotary gear 148. The shaft 122 extends through the rear side 156 and the recessed cavity section 160 of the housing 120.

Though in this embodiment, the recessed cavity section 160 is geometrically shaped in the form of a circular hole that is larger than the outermost diameter of the rotary gear 148, the cavity section 160 could be other geometrical shapes as well. For example, the recessed cavity section 160 may include the entire portion of the front side 154 that extends above the linear gear rack 146 as the recessed section. In that example, the outer section 158 would be the entire portion of the front side 154 that extends below the recessed cavity section 160.

The linear gear rack (i.e., locking device) 146 is rigidly attached to the housing 120. More specifically, the linear gear rack 146 is rigidly attached to the outer section 158 of the housing proximate the recessed cavity section 160. The gear rack in this embodiment is rigidly attached by mounting bolts 161, however it may be attached by other means as well, for example by welding. The gear rack 146 includes a linear toothed surface 162 having linear teeth 164 extending substantially perpendicular to the central axis 124 (best seen in FIG. 9).

The rotary gear 148 is circumferentially disposed over the shaft 122. The rotary gear 148 includes a circumferential outer toothed surface 166 having rotary gear teeth 168 extending radially around the central axis 124 (best seen in FIG. 9).

The spring 150 is circumferentially disposed over the shaft 122 between the housing 120 and the rotary gear 148. More specifically, the spring 150 is circumferentially disposed over the shaft 122 within the recessed cavity section 160 of the housing 120.

At least one drive key 152 (best seen in FIGS. 5, 7 and 8) is disposed between the rotary gear 148 and shaft 122, and between the handwheel 126 and shaft 122. The drive key 152 rotationally locks the rotary gear 148 and handwheel 126 to the shaft 122.

As will be explained in greater detail herein, the rotary gear 148 and handwheel 126 are operable to slide along the shaft 122 and the at least one drive key 152 from a first locked position 172 (best seen in FIG. 7) to a second unlocked position 174 (best seen in FIG. 8). In the first locked position 172, the rotary gear teeth 168 are engaged (for example, meshed) with the linear teeth 164 to rotationally lock the shaft 122 (best seen in FIG. 9). Also, in the first locked position 172, the spring 150 is extended to urge the rotary gear teeth 168 into such engagement with the linear teeth 164.

In the second unlocked position 174, the rotary gear teeth 168 are disengaged (for example, separated) from the linear teeth 164 to allow the shaft 122 to rotate. Also in the second unlocked position 174, a portion of the rotary gear 148 is disposed within the recessed cavity section 160. As such, the spring 150 is compressed (or retracted) by the rotary gear 148 to allow the rotary gear teeth 168 to be so disengaged from the linear teeth 164.

Figure 5:
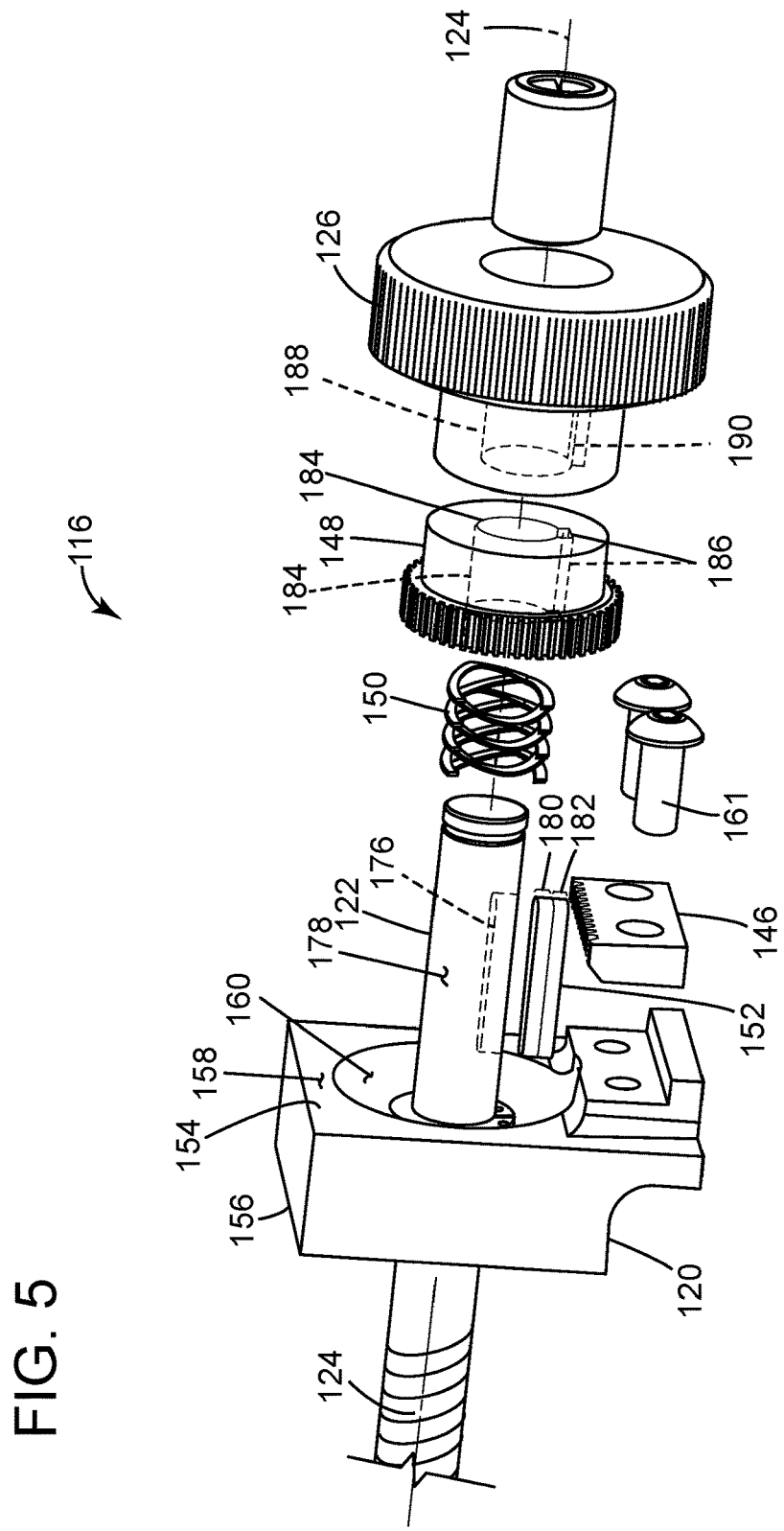
FIG. 5 is an exploded view of an exemplary embodiment of the handwheel assembly of FIG. 4 in accordance with the present invention.

Referring to FIG. 5, an exploded view of an exemplary embodiment of the handwheel assembly 116 of FIG. 4 is presented. The handwheel assembly 116 also includes a shaft slot 176, which is disposed in a circumferential outer surface 178 of the shaft 122. The shaft slot 176 extends substantially parallel to the central axis 124.

The at least one drive key 152 in this embodiment is a single drive key 152, and will be referred to as such herein. However the at least one drive key 152 can be more than one drive key depending on design considerations. The drive key 152 has a first longitudinal portion 180 (best seen in FIG. 9) disposed in the shaft slot 176 and a second longitudinal portion 182 (best seen in FIG. 9) extending radially beyond the outer surface 178 of the shaft 122.

The rotary gear 148 has a circumferential inner gear surface 184 disposed over the outer surface 178 of the shaft 122 and a gear slot 186 disposed in the inner gear surface 184. As will be discussed in greater detail with reference to FIGS. 7 and 8, the gear slot 186 is sized to be slidably disposed over the second portion 182 of the drive key 152 such that the rotary gear 148 may slide from the first locked position 172 to the second unlocked position 174 without the gear slot 186 disengaging from the drive key 152.

The handwheel 126 of the handwheel assembly 116 further includes a circumferential inner handwheel surface 188 disposed over the outer surface 178 of the shaft 122 and a handwheel slot 190 disposed in the inner handwheel surface 188. As will be discussed in greater detail with reference to FIGS. 7 and 8, the handwheel slot 190 is sized to be slidably disposed over the second portion 182 of the drive key 152 such that the handwheel 126 may slide from the first locked position 172 to the second unlocked position 174 without the handwheel slot 190 disengaging from the drive key 152.

In this embodiment, the handwheel 126 and rotary gear 148 are illustrated as two separate and distinct items. However, it is within the scope of this invention that the handwheel 126 and rotary gear 148 are integrally attached as one item.

Referring to FIGS. 6A, 6B, 6C and 6D, in this embodiment, the at least one drive key 152 is used to rotationally lock the handwheel 126 and rotary gear 148 to the shaft 122. However, it is within the scope of this invention that structures other than a drive key may be utilized to perform substantially the same function.

For example, the shaft 122 may include one of a spline section 300, a hexagonal section 302 and a square section 304 that the handwheel 126 and rotary gear 148 are circumferentially disposed on. The spline section 300, hexagonal section 302, square section 304 and/or any other like structure, may rotationally lock the rotary gear 148 and handwheel 126 to the shaft 122. The rotary gear 148 and handwheel 126 could be operable to slide along the one of the spline section 300, the hexagonal section 302 and the square section 304 from the first locked position to the second unlocked position.

Figure 7:
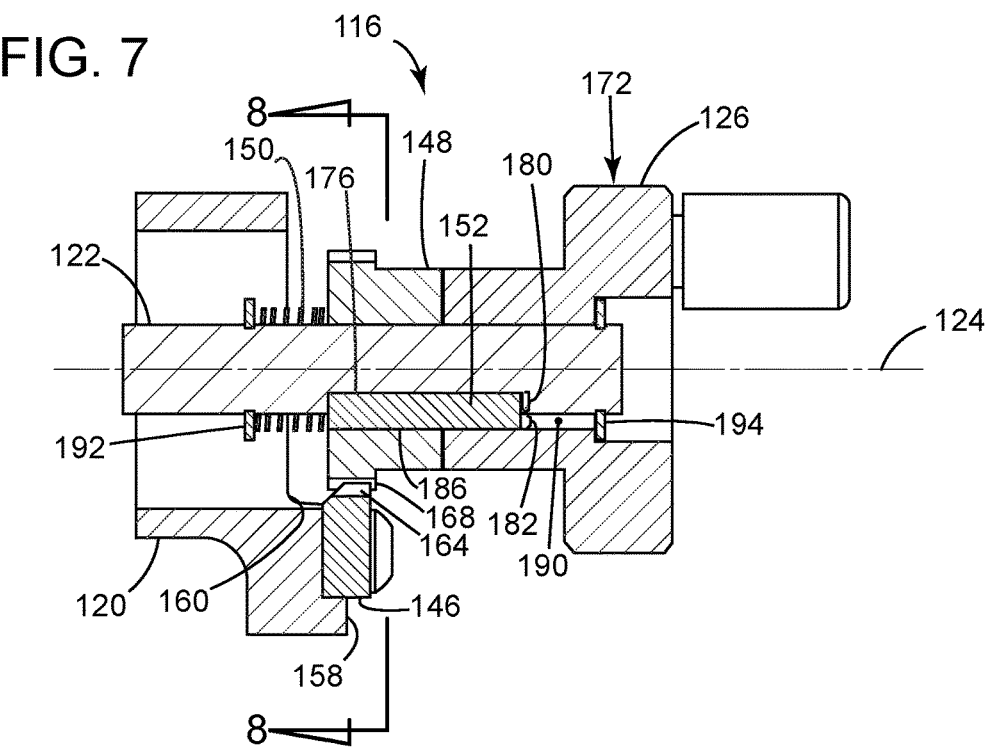
FIG. 7 is a side cross sectional view of an exemplary embodiment of the handwheel assembly of FIG. 4 in a first locked position in accordance with the present invention.

Referring to FIG. 7, a side cross sectional view of an exemplary embodiment of the handwheel assembly 116 of FIGS. 4 and 5 in the first locked position 172 in accordance with the present invention is presented. In the first locked position 172, the spring 150 is anchored at one end within the recessed cavity 160 by a retaining ring (or other like first anchoring device, such as a shoulder, pin or other structure) 192. The other end of the spring 150 urges a portion of the rotary gear teeth 168 of the rotary gear 148 beyond the recessed cavity section 160 to engage with the linear teeth 164 of the linear gear rack 146. Also in this first locked position 172, the first longitudinal portion 180 of the drive key 152 is engaged with the shaft slot 176 while the second longitudinal portion 182 of the drive key 152 is engaged with both the gear slot 186 and the handwheel slot 190. A second retaining ring (or other like second anchoring device) 194 is used to prevent the handwheel 126 from sliding off of the shaft 122 when the handwheel assembly 116 is fully extended in its locked position 172.

Therefore, the drive key 152 rotationally locks the handwheel 126 and the rotary gear 148 to the shaft 122. Additionally, the linear teeth 164 of the linear gear rack 146 locks the handwheel assembly 116 and prevents it from rotating. As such the centerline distance 147 between the first and second booms 138, 139 is locked as well.

Figure 8:
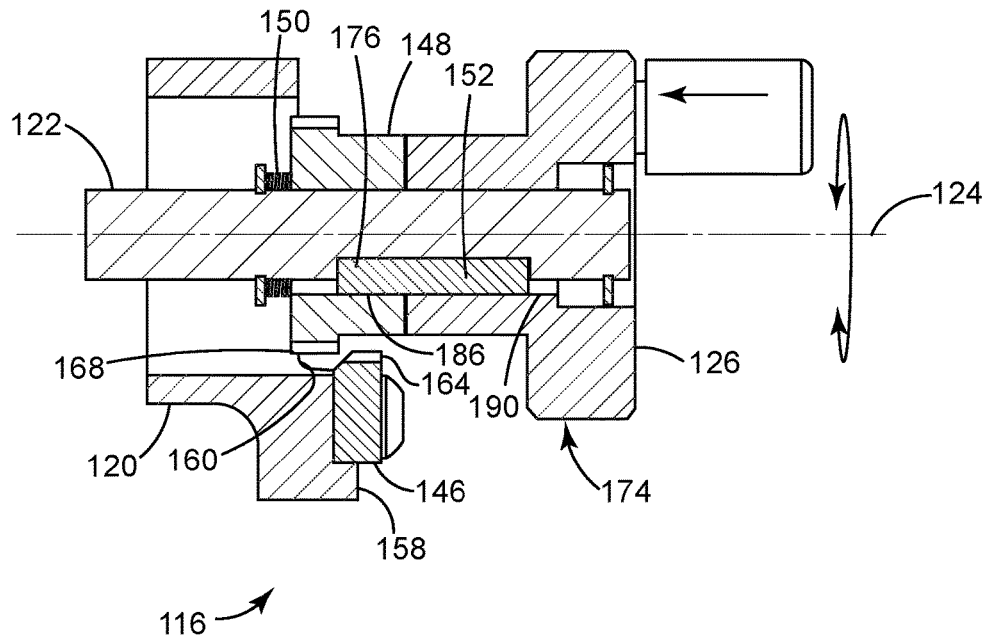
FIG. 8 is a side cross sectional view of an exemplary embodiment of the handwheel assembly of FIG. 4 in a second unlocked position in accordance with the present invention.

Referring to FIG. 8, a side cross sectional view of an exemplary embodiment of the handwheel assembly 116 of FIGS. 4 and 5 in the second unlocked position 174 in accordance with the present invention is presented. Due to the clearance between the second longitudinal portion 182 of the drive key 152 and both the gear slot 186 and handwheel slot 190, the handwheel 126 and rotary gear 148 can easily slide along the shaft 122 and drive key 152 into the second unlocked position 174. This can be accomplished by an operator simply pushing on the handwheel 126 by hand to compress the spring 150.

In the second unlocked position 174, the spring 150 is hand compressed by an operator and a portion of the rotary gear 146 is disposed within the recessed cavity section 160 to disengage the rotary gear teeth 168 from the linear teeth 164 of the linear gear rack 146. However, the drive key 152 is sized such that in this second unlocked position 174, the first longitudinal portion 180 of the drive key 152 is still engaged with the shaft slot 176 while the second longitudinal portion 182 of the drive key 152 is still engaged with both the gear slot 186 and the handwheel slot 190.

Therefore, the drive key 152 still rotationally locks the handwheel 126 and the rotary gear 148 to the shaft 122. However, the linear teeth 164 of the linear gear rack 146 are no longer engaged with the gear teeth of the rotary gear 148 and the handwheel assembly 116 is free to rotate. As such the centerline distance 147 between the first and second booms 138, 139 is unlocked and can be adjusted.

In the embodiments illustrated in FIGS. 7 and 8, the spring 150 is used as the actuating device 150 that extends to urge the handwheel assembly 116 into its locked position 172 and is retracted when the handwheel assembly is in its unlocked position 174. However, it is within the scope of this invention that other actuating devices may be utilized to perform substantially the same function as the spring 150. For example, the actuating device 150 may be a piston assembly or similar that is pneumatically, hydraulically or electrically driven from an extended position to a retracted position.

Figure 9:
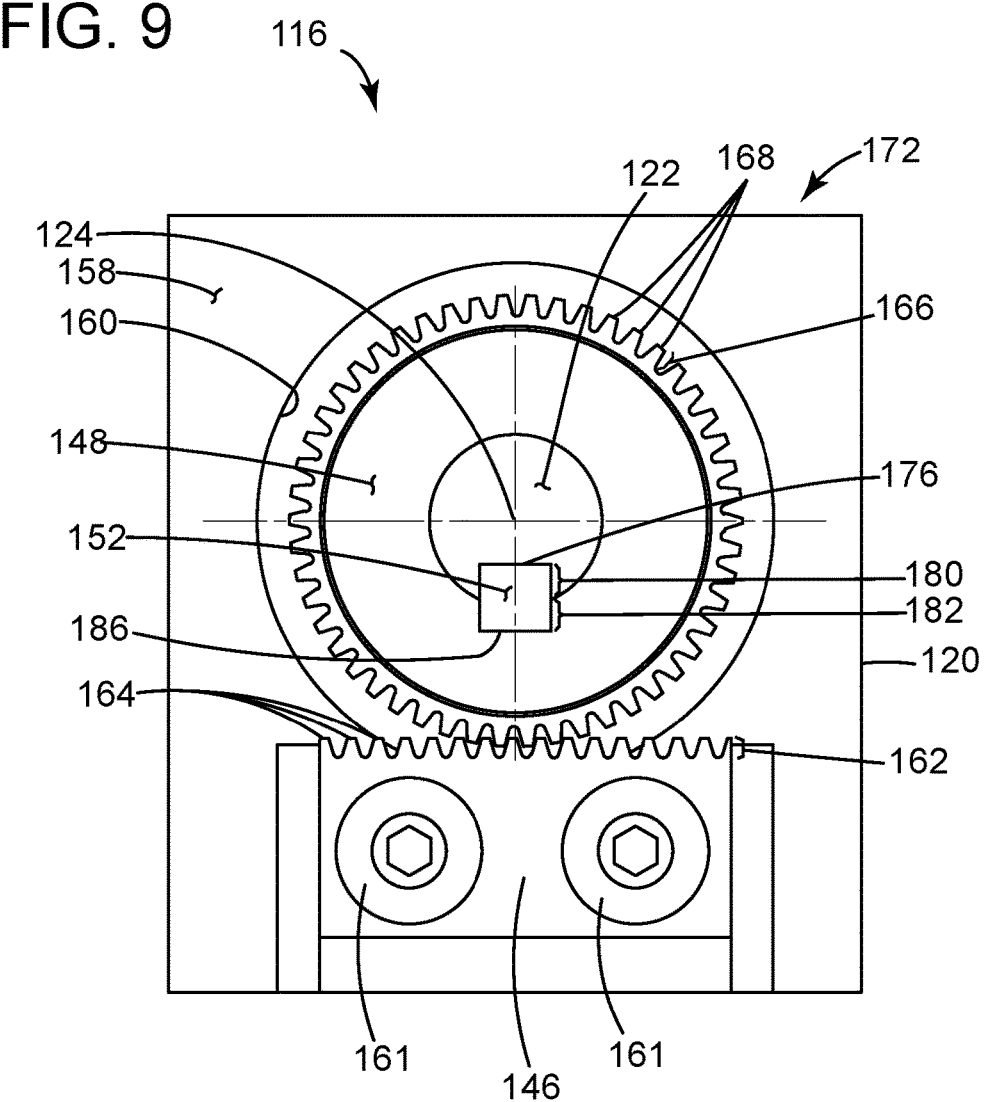
FIG. 9 is a front cross sectional view of an exemplary embodiment of the handwheel assembly of FIG. 4 taken along the line 8-8 of FIG. 7 in accordance with the present invention.

Referring to FIG. 9, a front cross sectional view of an exemplary embodiment of the handwheel assembly 116 of FIG. 7 taken along the section line 8-8 of FIG. 7 in accordance with the present invention is presented. The handwheel assembly 116 is in the first locked position 172. The rotary gear teeth 168 of the rotary gear 148 are engaged with the linear teeth 164 of the linear gear rack 146 to lock the handwheel assembly 116 in place. This will be done automatically by having an operator simply release the handwheel 126 to allow the spring 150 to urge the rotary gear teeth 168 and linear teeth 164 together.

The combination of the first longitudinal portion 180 of the drive key 152 being disposed in the shaft slot and the second longitudinal portion 182 of the drive key 152 being disposed in the gear slot 186 locks the shaft 122 such that the shaft 122 cannot rotate. Since rotation of the shaft 122 controls the movement of the boom 138 (best seen in FIG. 3), the boom 138 is also locked. Therefore, if both the first and second handwheel assemblies 116, 118 (best seen in FIG. 2) are in the first locked position 172, then the centerline distance 147 between the first and second booms 138 and 139 (best seen in FIG. 3) will also be locked.

Advantageously, the locking mechanism of the handwheel assembly 116 will be largely unaffected by any vibrations caused by the repetitive movement of the robot 10. This is substantially because the linear teeth 164 disposed along the linear toothed surface 162 of the linear gear rack 146 extend substantially perpendicular to the central axis 124. Any vibrations from the robot arm assembly 12 will tend to vibrate the shaft 122 and rotary gear 148 around the central axis 124 and will not tend to vibrate the shaft 122 or rotary gear 148 in a direction parallel to the central axis 124. Therefore, the handwheel assembly 116 will remain in its locked position 172 almost irrespective of the amount of vibration it is subjected to by the movement of the robot arm assembly 12.

Also advantageously, the handwheel assembly 116 can easily be moved into its second unlocked position 174 (best seen in FIG. 8) without the use of hand tools. Rather, an operator can simply apply pressure to the handwheel 126, which will compress the spring 150 to unlock the handwheel assembly 116 and move the handwheel assembly from its first locked position 172 to its second unlocked position 174. Once in the unlocked position 174, the centerline distance 147 between the first and second booms 138, 139 can be adjusted by rotating the handwheel 126 of the handwheel assembly 116. Once adjustments to the centerline distance 147 have been made, an operator may release the handwheel 126 and the handwheel assembly 116 will automatically be urged back into its first locked position 172 by the spring 150.

Referring to FIGS. 10A, 10B, 10C and 10D, in embodiments herein, the linear gear rack 146 is used as the locking device 146 to rotationally lock the rotary gear 148 (shown in FIG. 10A) when the handwheel assembly 116 is in the locked position 172. However, it is within the scope of this invention that structures other than the linear gear assembly 146 may be utilized as a locking device 146.

For example, the locking device 146 may be one of several types of locking racks (the linear gear rack 146 included), or other similar such structures, that can function as a locking device 146. The locking racks may have a locking surface upon which rack teeth are disposed that are operative to engage with the rotary gear teeth 168 of the rotary gear 148. One such example is illustrated in FIG. 10B, where the locking rack is a female gear 306 having a curved inner locking surface 308 upon which rack teeth 310 are disposed.

Figure 10C:
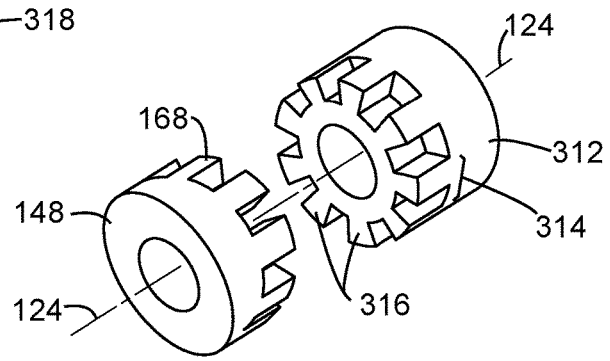

Another such example is illustrated in FIG. 10C, where the locking rack is a curvic coupling 312 having a curved locking rack surface 314 upon which rack teeth 316 are disposed. In the case of the curvic coupling 312, the rack teeth 316 extend substantially parallel to the axis 124 of the shaft 122. Accordingly, in order to be able to mate with the rack teeth 316 of the curvic coupling 312, the rotary gear teeth 168 of the rotary gear 148 would also have to extend parallel to the axis 124.

Another example of a locking device 146 is illustrated in FIG. 10D, where a locking rack 318 has a locking surface that does not have any rack teeth disposed on it at all. Rather the rack surface has a rack flat portion 320. In order to mate with the rack flat portion 320 of the locking rack 318, the circumferential outer surface of the rotary gear 148 would have to have a plurality of rotary gear flats 322 (rather than rotary gear teeth) that would engage with the rack flat portion 320 of the locking rack 318.

Referring to FIG. 11, a perspective view of another exemplary embodiment of a parallel gripper assembly 200 operable to attach to the robot arm assembly 12 of FIG. 1 is presented. The parallel gripper assembly 200 is similar in form and function to that of parallel gripper assembly 100 (best seen in FIG. 2), but includes only a single handwheel assembly 116 mounted on the frame 102. The handwheel assembly 116, in this embodiment, is operatively connected to both a first lead screw 204 mounted on the first side 104 of the frame 102 and a second lead screw 208 mounted on the second side 106 of the frame 102 in accordance with the present invention.

Similar to that of parallel gripper assembly 100, the parallel gripper assembly 200 includes the handwheel assembly 116 disposed on the first side 104 at the first end portion 110 of the frame 102. Handwheel assembly 116 includes the same housing 120, shaft 122, handwheel 126, linear gear rack 146 (best seen in FIG. 5), and drive key 152 (best seen in FIG. 5). The shaft 122, in this embodiment, rotates around a first central axis 202. The handwheel assembly 116 is operable to move between the first locked position 172 and the second unlocked position 174 as described in detail herein.

Parallel gripper assembly 200 also includes a first lead screw 204 that is disposed on the first side 104 of the frame 102 and is rigidly connected to the shaft 122 such that the first lead screw 204 rotates about the first central axis 202 when the shaft 122 is rotated by the handwheel 126. The first lead screw 204 has a first set of threads 206 which are one of a left hand thread or a right hand thread.

The parallel gripper assembly 200 also includes a second lead screw 208 operably connected to the first lead screw 204 such that the second lead screw 208 rotates about a second central axis 210 when the shaft 122 is rotated by the handwheel 126. The second lead screw 208 is disposed on the second side 106 of the frame 102. The second lead screw 208 has a second set of threads 212. The second set of threads 212 are the other of the left hand threads and the right hand threads relative to the first set of threads 206. In other words, the second set of threads 212 must be the opposite orientation as that of the first set of threads 206. So if the first set of threads 206 are right hand threads, the second set of threads 212 must be left hand threads. Further, if the first set of threads 206 are left hand threads, then the second set of threads 212 must be right hand threads.

In this embodiment, the first and second lead screws 204, 208 are operatively connected together by a coupler 214 such that the first and second central axes 202, 210 are substantially the same. However, it is possible that the two central axes 202, 210 are not the same and are operatively connected together with a more complex gearing system. Additionally, it is possible that the first and second lead screws 204, 208 are integral portions of the shaft 122 having the same central axis.

The parallel gripper assembly 200 includes a first mounting plate 216 that is movably engaged with the first lead screw 204 such that rotation of the first lead screw 204 moves the first mounting plate 216 longitudinally along the first lead screw 204. Additionally a second mounting plate 218 is movably engaged with the second lead screw 208 such that rotation of the second lead screw 208 moves the second mounting plate 218 longitudinally along the second lead screw 208.

Because the first and second threads 206, 212 are opposite in orientation, then when the handwheel 126 is rotated in one of a clockwise and a counterclockwise direction, the first and second mounting plates 216, 218 move away from each other and, when the handwheel 126 is rotated in the other of the clockwise and the counterclockwise direction, the first and second mounting plates 216, 218 move toward each other. In other words, when the handwheel 126 is rotated in a given direction, by way of example in the clockwise direction, the first and second mounting plates 216, 218 will move toward each other. Additionally, by way of this same example, when the handwheel 126 is rotated in the opposite direction, for this example in the counterclockwise direction, then the first and second mounting plates 216, 218 must move away from each other.

Advantageously, in this embodiment of parallel gripper assembly 200, the centerline distance 147 between booms 138 and 139 (best seen in FIG. 3) can be adjusted with a single handwheel assembly 116. This is because the first boom 138 is rigidly connected to the first mounting plate 216 and the second boom 139 is rigidly connected to the second mounting plate 218.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A handwheel assembly comprising:
   a housing;
   a shaft rotatably supported by the housing, the shaft having a central axis;
   a locking device rigidly attached to the housing;
   a rotary gear circumferentially disposed over the shaft; and
   a handwheel circumferentially disposed over the shaft;
   wherein, the rotary gear and handwheel are operable to slide along the shaft from a first locked position to a second unlocked position, and
   wherein, in the first locked position, the rotary gear is engaged with the locking device to rotationally lock the shaft and, in the second unlocked position, the rotary gear is disengaged from the locking device to allow the shaft to rotate.

2. The handwheel assembly of claim 1 comprising:
the locking device being a locking rack, the locking rack including a locking surface having one of rack teeth and a rack flat portion disposed on the locking surface; and
the rotary gear including a circumferential outer surface having one of rotary gear teeth and rotary gear flats disposed on the outer surface;
wherein, in the first locked position, the one of the rotary gear teeth and rotary gear flats are engaged with the one of the rack teeth and rack flat portion to rotationally lock the shaft and, in the second unlocked position, the one of the rotary gear teeth and rotary gear flats are disengaged from the one of the rack teeth and rack flat portion to allow the shaft to rotate.

3. The handwheel assembly of claim 2 comprising:
the locking rack being a linear gear rack;
the locking surface being a linear toothed surface;
the one of rack teeth and rack flat portion being linear teeth extending substantially perpendicular to the central axis; and
the one of rotary gear teeth and rotary gear flats being rotary gear teeth extending radially around the central axis;
wherein, in the first locked position, the rotary gear teeth are engaged with the linear teeth to rotationally lock the shaft and, in the second unlocked position, the rotary gear teeth are disengaged from the linear teeth to allow the shaft to rotate.

4. The handwheel assembly of claim 1 comprising at least one drive key rotationally locking the rotary gear and the handwheel to the shaft, the rotary gear and handwheel being operable to slide along the shaft and the at least one drive key from the first locked position to the second unlocked position.

5. The handwheel assembly of claim 4 comprising:
a shaft slot disposed in a circumferential outer surface of the shaft, the shaft slot extending substantially parallel to the central axis;
the at least one drive key having a first longitudinal portion disposed in the shaft slot and a second longitudinal portion extending radially beyond the outer surface of the shaft; and
the rotary gear having a circumferential inner gear surface disposed over the outer surface of the shaft and a gear slot disposed in the inner gear surface, the gear slot sized to be slidably disposed over the second portion of the at least one drive key such that the rotary gear may slide from the first locked position to the second unlocked position without the gear slot disengaging from the at least one drive key.

6. The handwheel assembly of claim 5 comprising the handwheel having a circumferential inner handwheel surface disposed over the outer surface of the shaft and a handwheel slot disposed in the inner handwheel surface, the handwheel slot sized to be slidably disposed over the second portion of the at least one drive key such that the handwheel may slide from the first locked position to the second unlocked position without the handwheel slot disengaging from the at least one drive key.

7. The handwheel assembly of claim 1 wherein the shaft comprises one of a spline section, a hexagonal section and a square section rotationally locking the rotary gear and handwheel to the shaft, the rotary gear and handwheel being operable to slide along the one of the spline section, the hexagonal section and the square section from the first locked position to the second unlocked position.

8. The handwheel assembly of claim 1 comprising:
a actuating device disposed between the housing and the rotary gear;
wherein, in the first locked position, the actuating device is extended to urge the rotary gear into engagement with the locking device; and
wherein, in the second unlocked position, the actuating device is retracted to allow the rotary gear to disengage from the locking device.

9. The handwheel assembly of claim 8 wherein the actuating device is a spring circumferentially disposed over the shaft.

10. The handwheel assembly of claim 8 comprising:
the housing having a front side and a rear side, the front side having an outer section adjacent a recessed cavity section, the recessed cavity section sized to receive an outer circumference of the rotary gear;
the shaft extending through the rear side and the recessed cavity section of the housing;
the actuating device disposed over the shaft within the recessed cavity section of the housing; and
the locking device rigidly attached to the outer section of the housing;
wherein, in the second unlocked position, a portion of the rotary gear is disposed within the recessed cavity section.

11. The handwheel assembly of claim 10 wherein, in the first locked position, the actuating device urges a portion of the rotary gear beyond the recessed cavity section to engage with the locking device.

12. The handwheel assembly of claim 1 comprising:
a lead screw rigidly connected to the shaft such that the lead screw rotates about the central axis when the shaft is rotated by the handwheel; and
a first mounting plate movably engaged with the lead screw such that rotation of the lead screw moves the mounting plate longitudinally along the lead screw.

13. The handwheel assembly of claim 12 wherein the lead screw is a separate component releasably connectable to the shaft.

14. The handwheel assembly of claim 12 wherein the lead screw is an integral portion of the shaft.

15. The handwheel assembly of claim 12 comprising:
a linear bearing extending longitudinally substantially parallel to the lead screw;
wherein the first mounting plate is movably engaged with linear bearing such that the first mounting plate moves longitudinally along the linear bearing as it moves longitudinally along the lead screw.

16. The handwheel assembly of claim 12, wherein the handwheel assembly is a part of a parallel gripper assembly for a robot arm assembly, the parallel gripper assembly further comprising:
a first boom rigidly attached to the mounting plate; and
a second boom rigidly attached to a second mounting plate;
wherein, when the handwheel is in the second unlocked position, rotation of the handwheel adjusts a distance between the first and second booms and, when the handwheel is in the first locked position, the distance between the first and second booms is locked.

17. A handwheel assembly comprising:
a housing;
a shaft rotatably supported by the housing, the shaft having a central axis;

a linear gear rack rigidly attached to the housing, the gear rack including a linear toothed surface having linear teeth extending substantially perpendicular to the central axis;

a rotary gear circumferentially disposed over the shaft, the rotary gear including a circumferential outer toothed surface having rotary gear teeth extending radially around the central axis;

a spring circumferentially disposed over the shaft between the housing and the rotary gear; and a handwheel circumferentially disposed over the shaft;

wherein, the rotary gear and handwheel are operable to slide along the shaft from a first locked position to a second unlocked position, and wherein, in the first locked position, the spring is extended to urge the rotary gear teeth into engagement with the linear teeth and, in the second unlocked position, the spring is compressed to allow the rotary gear teeth to disengage from the linear teeth.

18. The handwheel assembly of claim 17 comprising:
a lead screw rigidly connected to the shaft such that the lead screw rotates about the central axis when the shaft is rotated by the handwheel;

a mounting plate movably engaged with the lead screw such that rotation of the lead screw moves the mounting plate longitudinally along the lead screw.

19. The handwheel assembly of claim 18 comprising:
a linear bearing extending longitudinally substantially parallel to the lead screw;

wherein the mounting plate is movably engaged with linear bearing such that the mounting plate moves longitudinally along the linear bearing as it moves longitudinally along the lead screw.

20. A parallel gripper assembly comprising:
a frame having a first side, a second side and a top side, the first and second sides extending longitudinally between a first end portion and a second end portion, the top side having a mounting structure disposed thereon operable to rigidly attach to a robot arm assembly;

a first handwheel assembly rigidly attached to the first side at the first end portion of the frame;

a second handwheel assembly rigidly attached to the second side at the second end portion of the frame;

the first and second handwheel assemblies each including:
  a housing;
  a shaft rotatably supported by the housing, the shaft having a central axis;
  a locking device rigidly attached to the housing;
  a rotary gear circumferentially disposed over the shaft; and
  a handwheel circumferentially disposed over the shaft;
  wherein, the rotary gear and handwheel are operable to slide along the shaft from a first locked position to a second unlocked position, and
  wherein, in the first locked position, the rotary gear is engaged with the locking device to rotationally lock the shaft and, in the second unlocked position, the rotary gear is disengaged from the locking device to allow the shaft to rotate.

21. The parallel gripper assembly of claim 20 wherein each of the first and second handwheel assemblies comprise:
a lead screw rigidly connected to the shaft such that the lead screw rotates about the central axis when the shaft is rotated by the handwheel;

a mounting plate movably engaged with the lead screw such that rotation of the lead screw moves the mounting plate longitudinally along the lead screw.

22. The parallel gripper assembly of claim 21 wherein each of the first and second handwheel assemblies comprise:
a linear bearing rigidly connected to the frame and extending longitudinally substantially parallel to the lead screw;

wherein the mounting plate is movably engaged with linear bearing such that the mounting plate moves longitudinally along the linear bearing as it moves longitudinally along the lead screw.

23. A parallel gripper assembly comprising:
a frame having a first side, a second side and a top side, the first and second sides extending longitudinally between a first end portion and a second end portion, the top side having a mounting structure disposed thereon operable to rigidly attach to a robot arm assembly;

a handwheel assembly rigidly attached to the first side at the first end portion of the frame, the handwheel assembly including:
  a housing;
  a shaft rotatably supported by the housing, the shaft having a first central axis;
  a handwheel circumferentially disposed over the shaft;
  a first lead screw rigidly connected to the shaft such that the first lead screw rotates about the first central axis when the shaft is rotated by the handwheel, the first lead screw having one of a left hand thread and a right hand thread;
  a locking device rigidly attached to the housing; and
  a rotary gear circumferentially disposed over the shaft;
  wherein, the rotary gear and handwheel are operable to slide along the shaft from a first locked position to a second unlocked position, and
  wherein, in the first locked position, the rotary gear is engaged with the locking device to rotationally lock the shaft and, in the second unlocked position, the rotary gear is disengaged from the locking device to allow the shaft to rotate; and a second lead screw operably connected to the first lead screw such that the second lead screw rotates about a second central axis when the shaft is rotated by the handwheel, the second lead screw being disposed on the second side of the frame and having the other of the left hand thread and the right hand thread.

24. The parallel gripper assembly of claim 23 comprising the second lead screw being coupled to the first lead screw such that the first and second central axes are substantially the same.

25. The parallel gripper assembly of claim 23 wherein the first and second lead screws are integral portions of the shaft.

26. The parallel gripper assembly of claim 23 comprising:
a first mounting plate movably engaged with the first lead screw such that rotation of the first lead screw moves the first mounting plate longitudinally along the first lead screw; and a second mounting plate movably engaged with the second lead screw such that rotation of the second lead screw moves the second mounting plate longitudinally along the second lead screw;

wherein, when the handwheel is rotated in one of a clockwise and a counterclockwise direction, the first and second mounting plates move away from each other and, when the handwheel is rotated in the other of the clockwise and the counterclockwise direction, the first and second mounting plates move toward each other.

* * * * *